(12) United States Patent
Nakamura et al.

(10) Patent No.: US 8,157,694 B2
(45) Date of Patent: *Apr. 17, 2012

(54) OUTBOARD MOTOR

(75) Inventors: Daisuke Nakamura, Shizuoka-ken (JP);
Yoshihiko Okabe, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 123 days.

This patent is subject to a terminal disclaimer.

(21) Appl. No.: 11/855,991

(22) Filed: Sep. 14, 2007

(65) Prior Publication Data

US 2008/0070739 A1    Mar. 20, 2008

Related U.S. Application Data

(63) Continuation of application No. PCT/JP2006/313675, filed on Jul. 10, 2006.

(30) Foreign Application Priority Data

Jul. 14, 2005   (JP) ................................. 2005-205025

(51) Int. Cl.
*F16H 3/44* (2006.01)
*B63H 20/14* (2006.01)
*B63H 23/00* (2006.01)
*B63H 21/21* (2006.01)

(52) U.S. Cl. ........ 475/269; 475/270; 475/293; 475/312; 440/75; 440/86

(58) Field of Classification Search .................. 475/269, 475/270, 293, 292, 311, 312; 440/75, 80, 440/81, 86

See application file for complete search history.

(56) References Cited

U.S. PATENT DOCUMENTS

| 2,688,298 | A |   | 9/1954  | Long |
|-----------|---|---|---------|------|
| 2,751,799 | A |   | 6/1956  | Long |
| 3,404,586 | A |   | 10/1968 | Fanstone |
| 3,483,771 | A | * | 12/1969 | Wolfgang et al. ............. 475/276 |
| 4,747,795 | A | * | 5/1988  | Kawamura et al. ............. 440/75 |
| 4,850,911 | A |   | 7/1989  | Nakahama et al. |
| 5,564,992 | A | * | 10/1996 | Cunningham ................ 475/257 |
| 6,350,165 | B1| * | 2/2002  | Neisen ............................ 440/75 |
| 6,435,923 | B1|   | 8/2002  | Ferguson |

(Continued)

FOREIGN PATENT DOCUMENTS

DE          3102556 A1 *  8/1982

(Continued)

*Primary Examiner* — Tisha Lewis
(74) *Attorney, Agent, or Firm* — Keating & Bennett, LLP

(57) ABSTRACT

In an outboard motor having a power transmission mechanism for transmitting power of an engine to a propeller, the power transmission mechanism has a transmission ratio changing unit having a planetary gear train including a sun gear, planetary gears, and an internal gear. The internal gear is connected to an input side shaft on the engine side. The planetary gears are connected to an output side shaft on the propeller side. The sun gear is connected to a stationary portion via a one-way clutch. The planetary gears and the internal gear and/or the sun gear are connected by an on-off clutch. When the on-off clutch is disengaged, the one-way clutch is engaged and the speed from the input side shaft is outputted from the output side shaft with a reduced speed. When the on-off clutch is engaged, the speed from the input side shaft is outputted from the output side shaft with the same speed.

12 Claims, 18 Drawing Sheets

U.S. PATENT DOCUMENTS

| | | | |
|---|---|---|---|
| 6,439,937 B1 * | 8/2002 | Mansson et al. | 440/75 |
| 6,554,663 B2 * | 4/2003 | Neisen | 440/75 |
| 6,769,185 B2 * | 8/2004 | Kottke et al. | 30/276 |
| 7,585,241 B2 * | 9/2009 | Tamba et al. | 475/53 |
| 7,704,183 B2 * | 4/2010 | Nakamura et al. | 475/312 |
| 2007/0218786 A1 * | 9/2007 | Tamba et al. | 440/86 |
| 2008/0227585 A1 * | 9/2008 | Okabe | 475/269 |

FOREIGN PATENT DOCUMENTS

| | | |
|---|---|---|
| GB | 600790 A | 4/1948 |
| GB | 833343 A | 4/1960 |
| JP | 02256592 A * | 10/1990 |
| WO | 00/38981 A1 | 7/2000 |
| WO | WO 2005102836 A1 * | 11/2005 |

* cited by examiner

[FIG. 1]
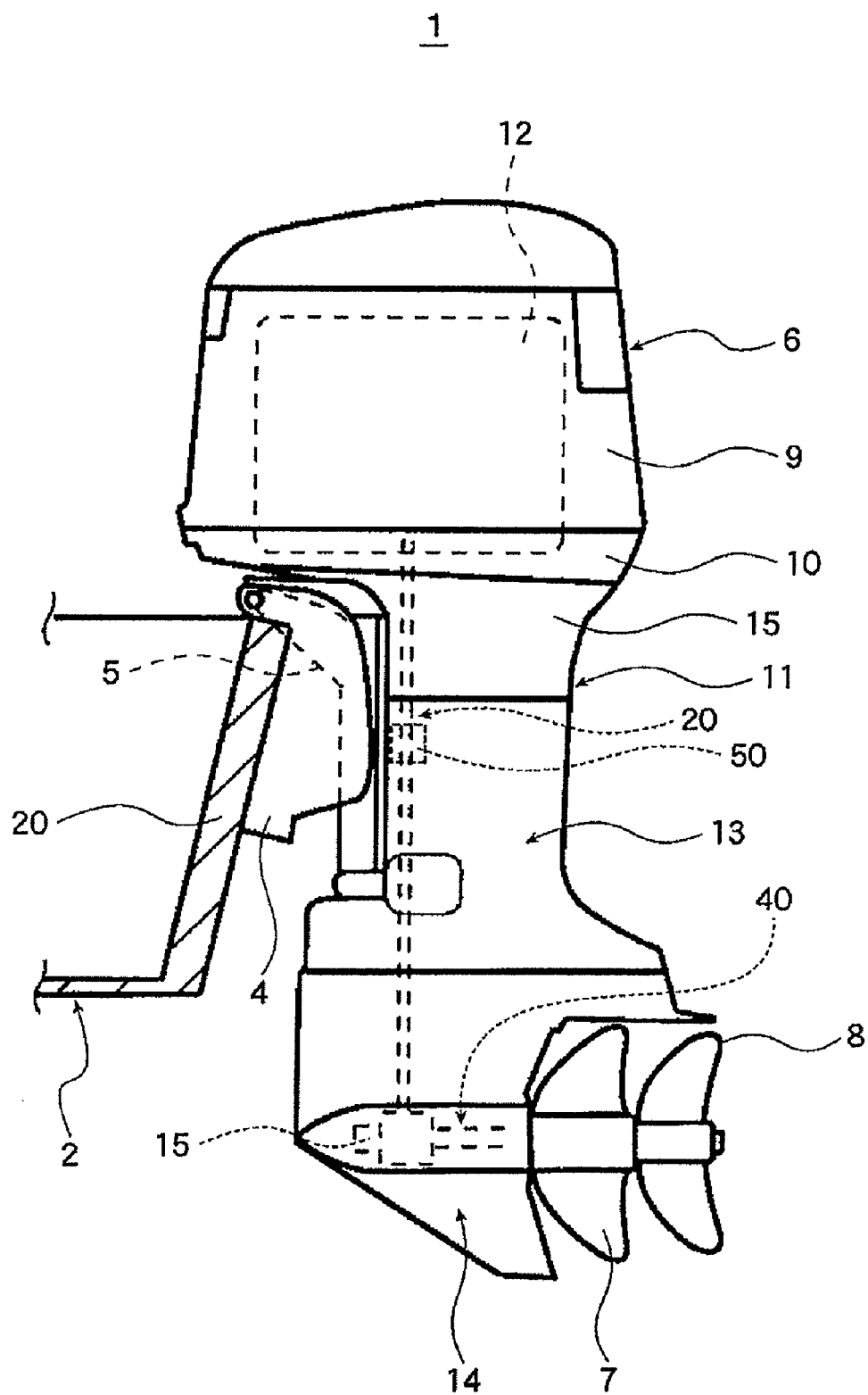

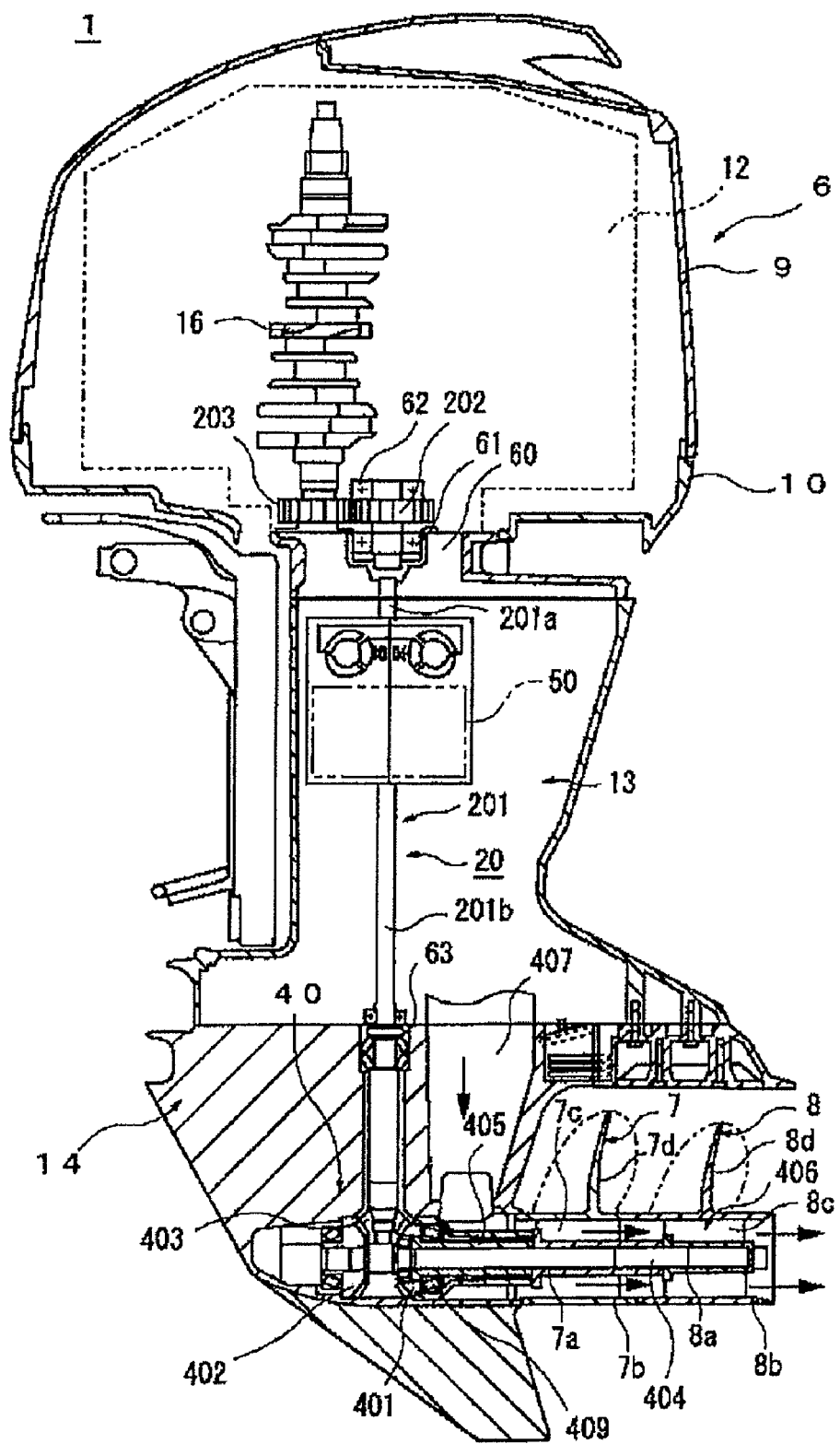
[FIG. 2]

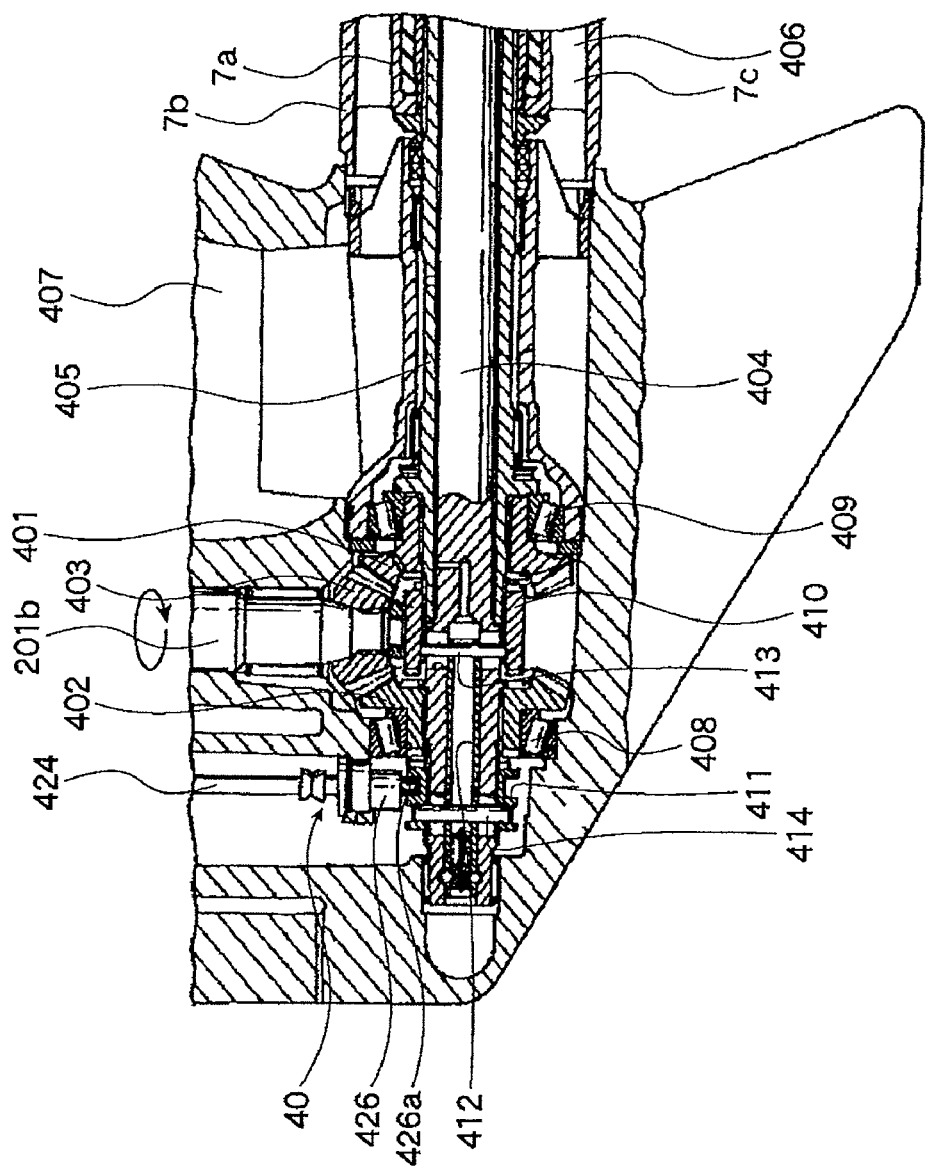
[FIG. 3]

[FIG. 4]
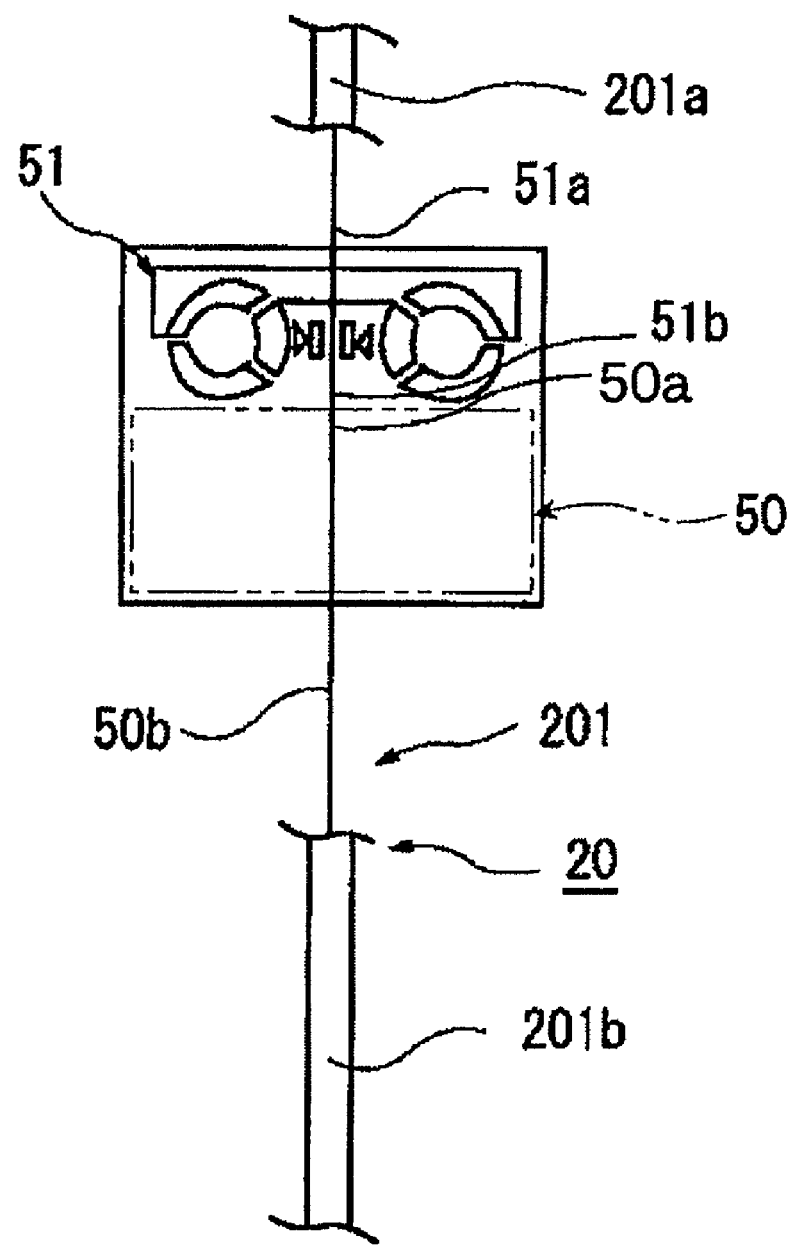

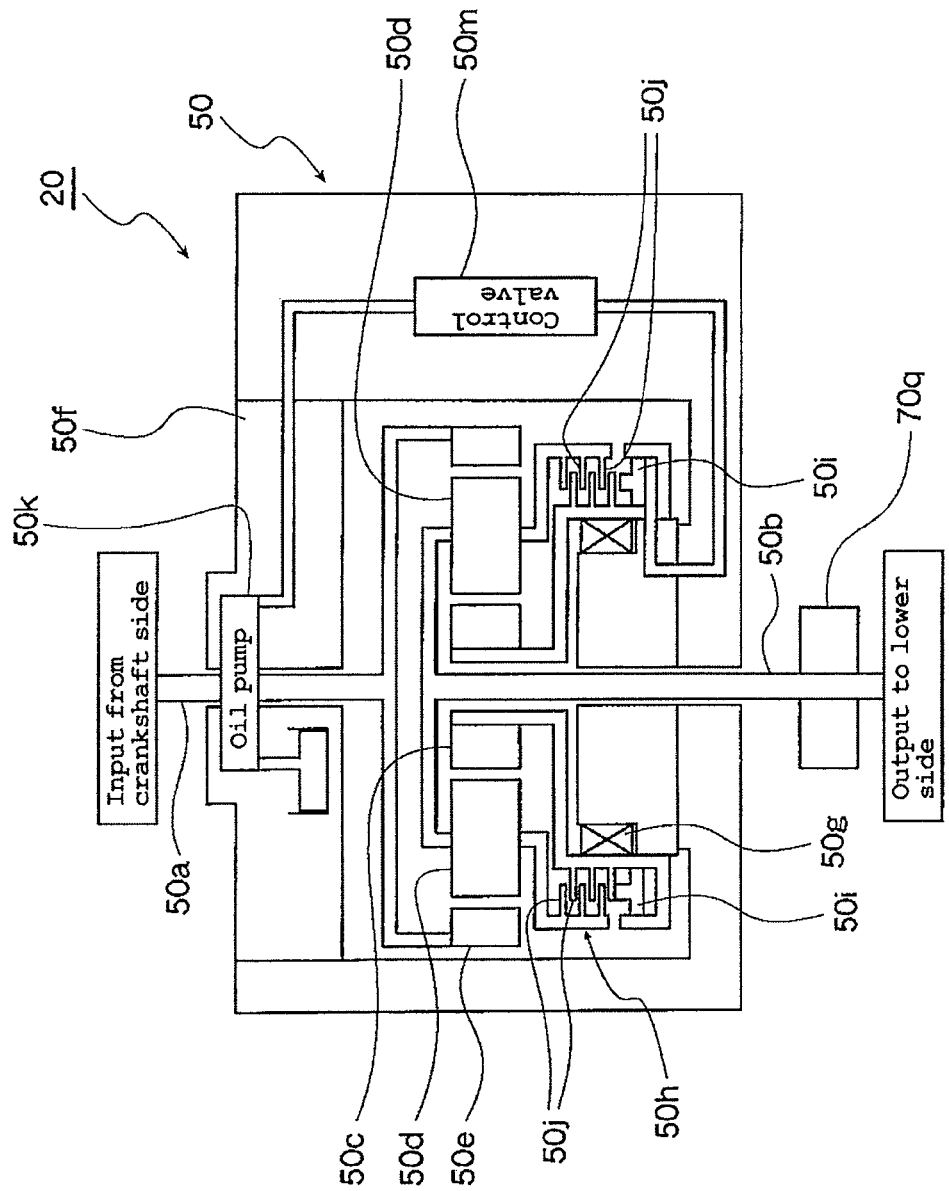
[FIG. 5]

[FIG. 6]
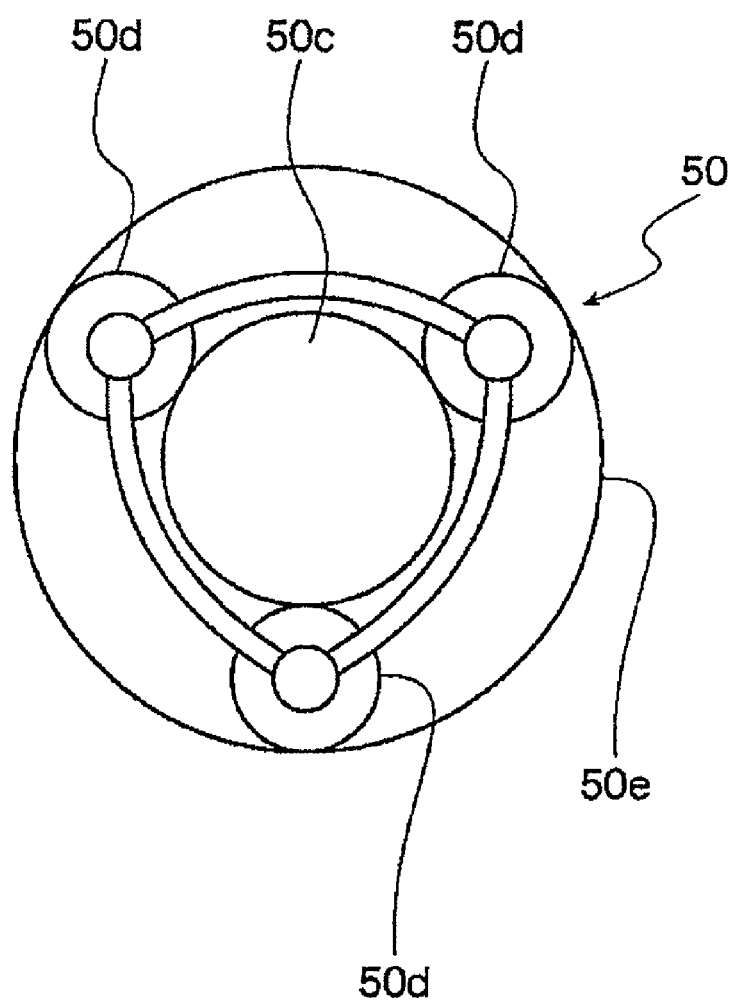

[FIG. 7A]
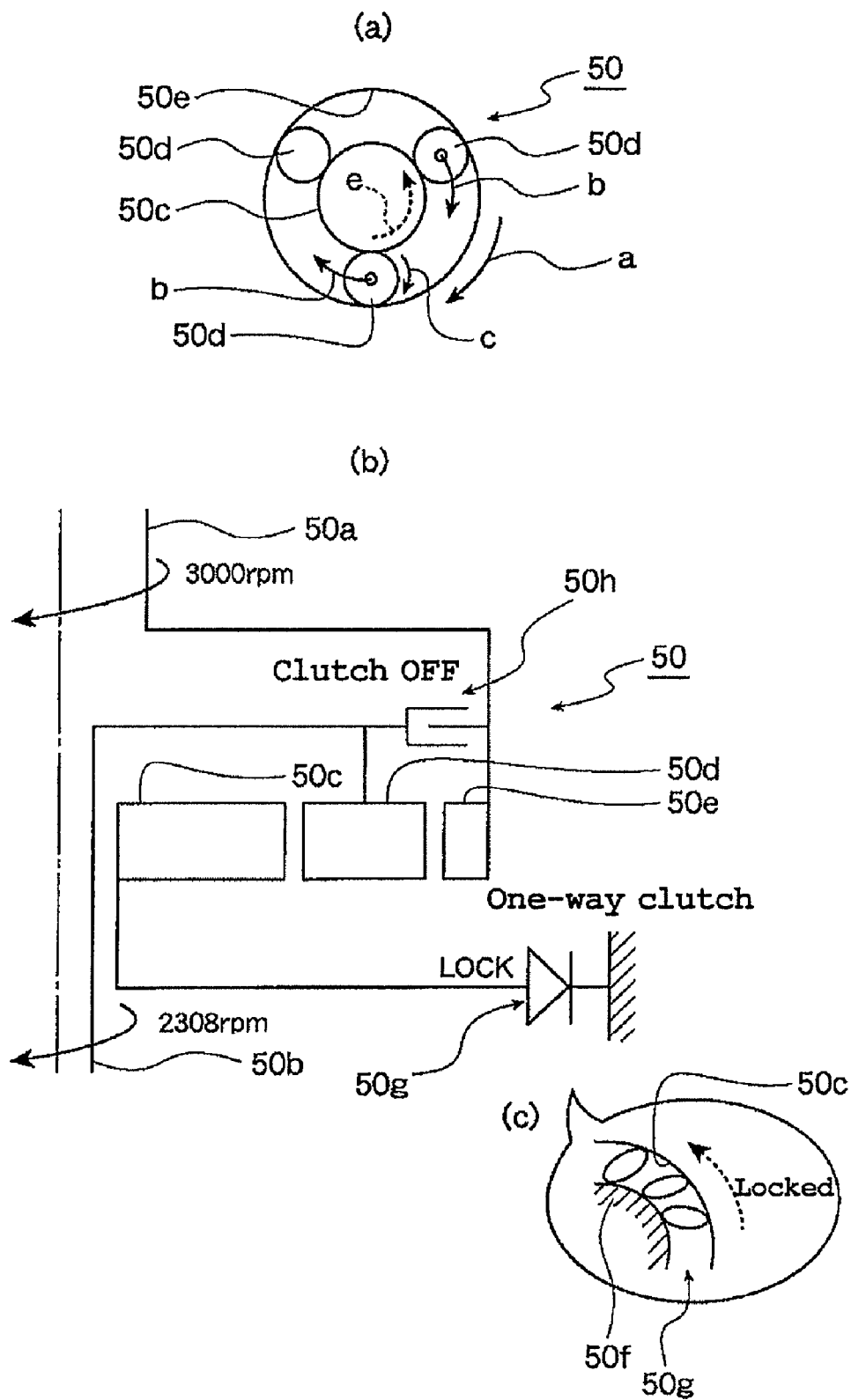

[FIG. 7B]
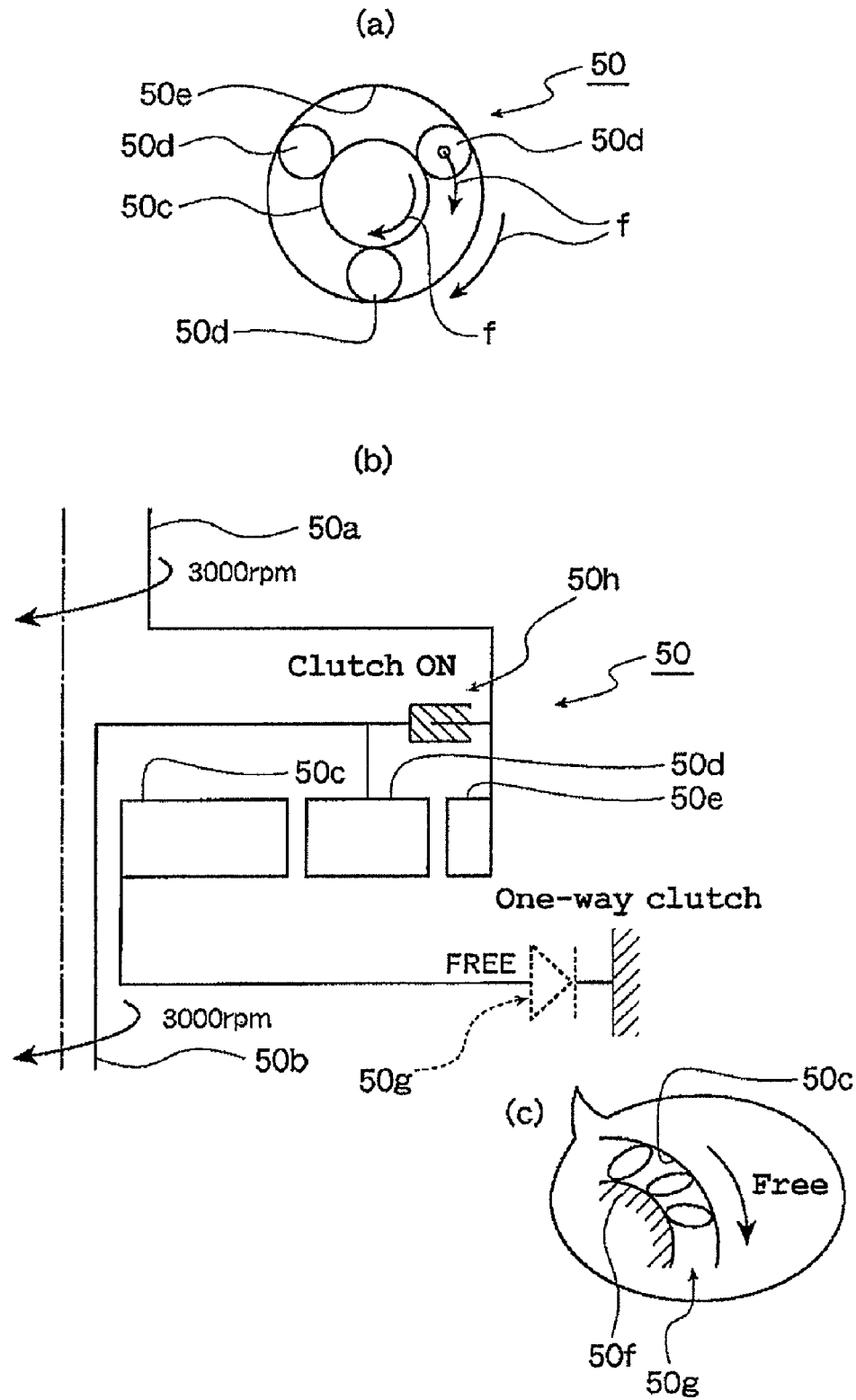

[FIG. 8]
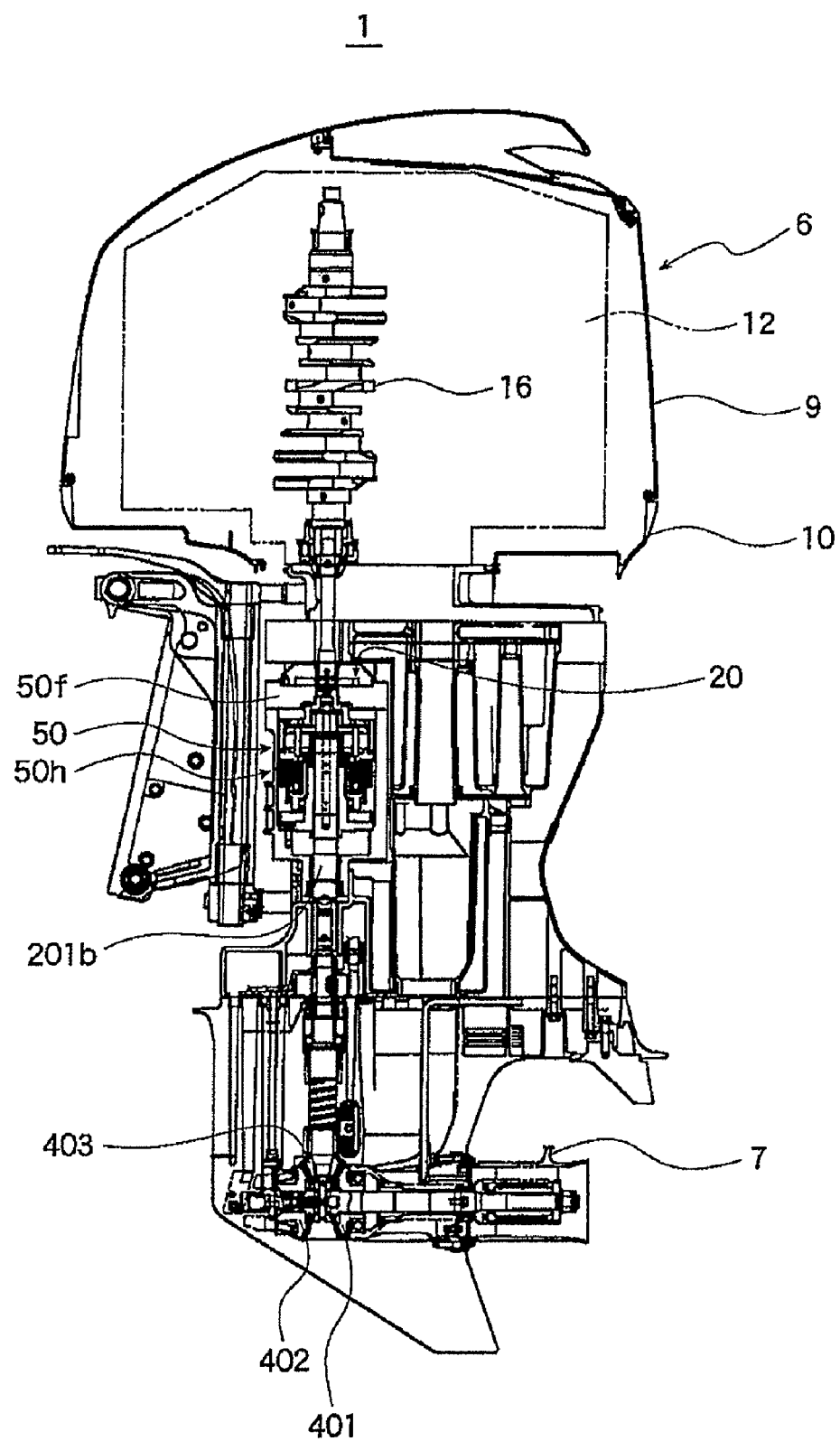

[FIG. 9]
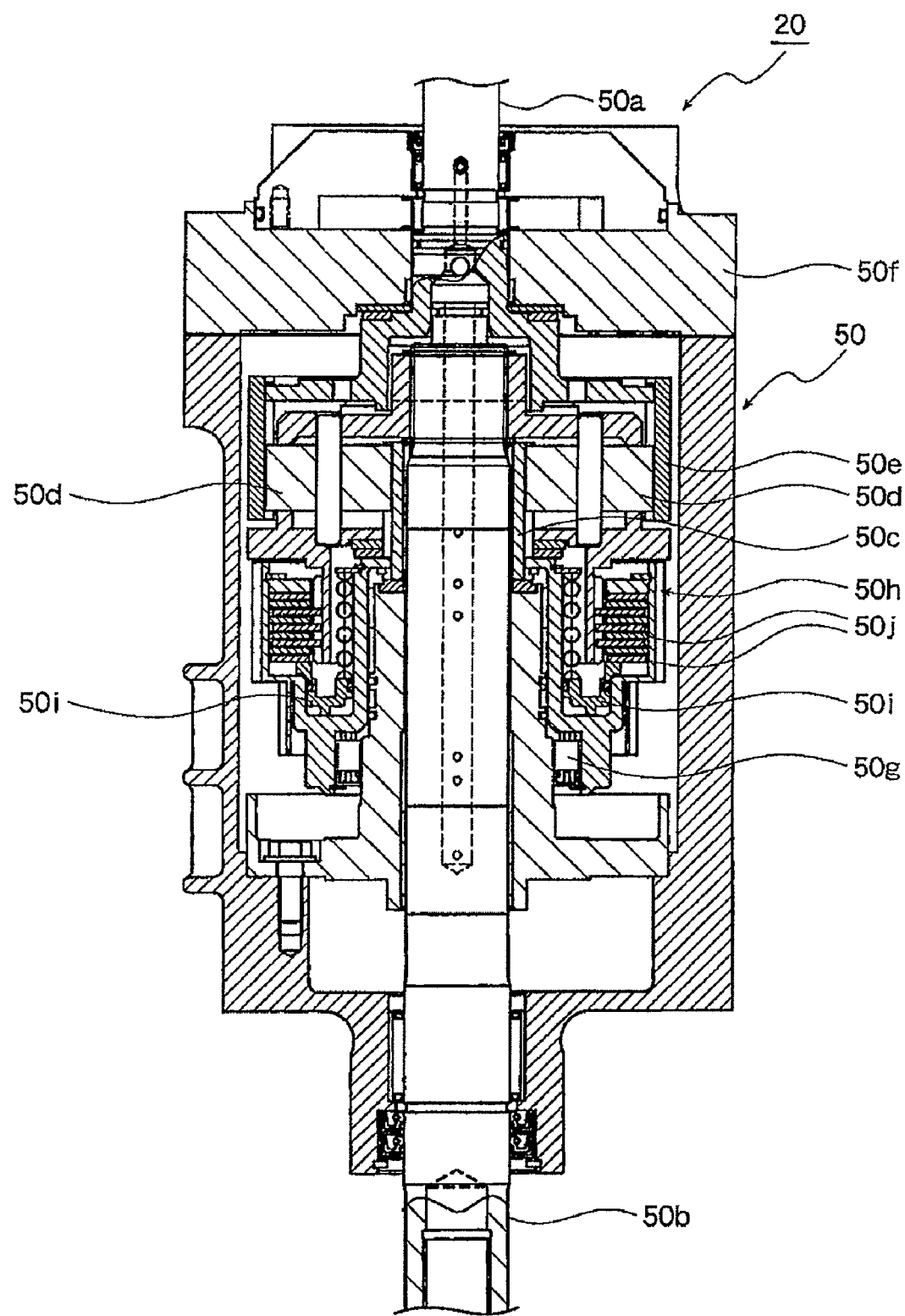

[FIG. 10]
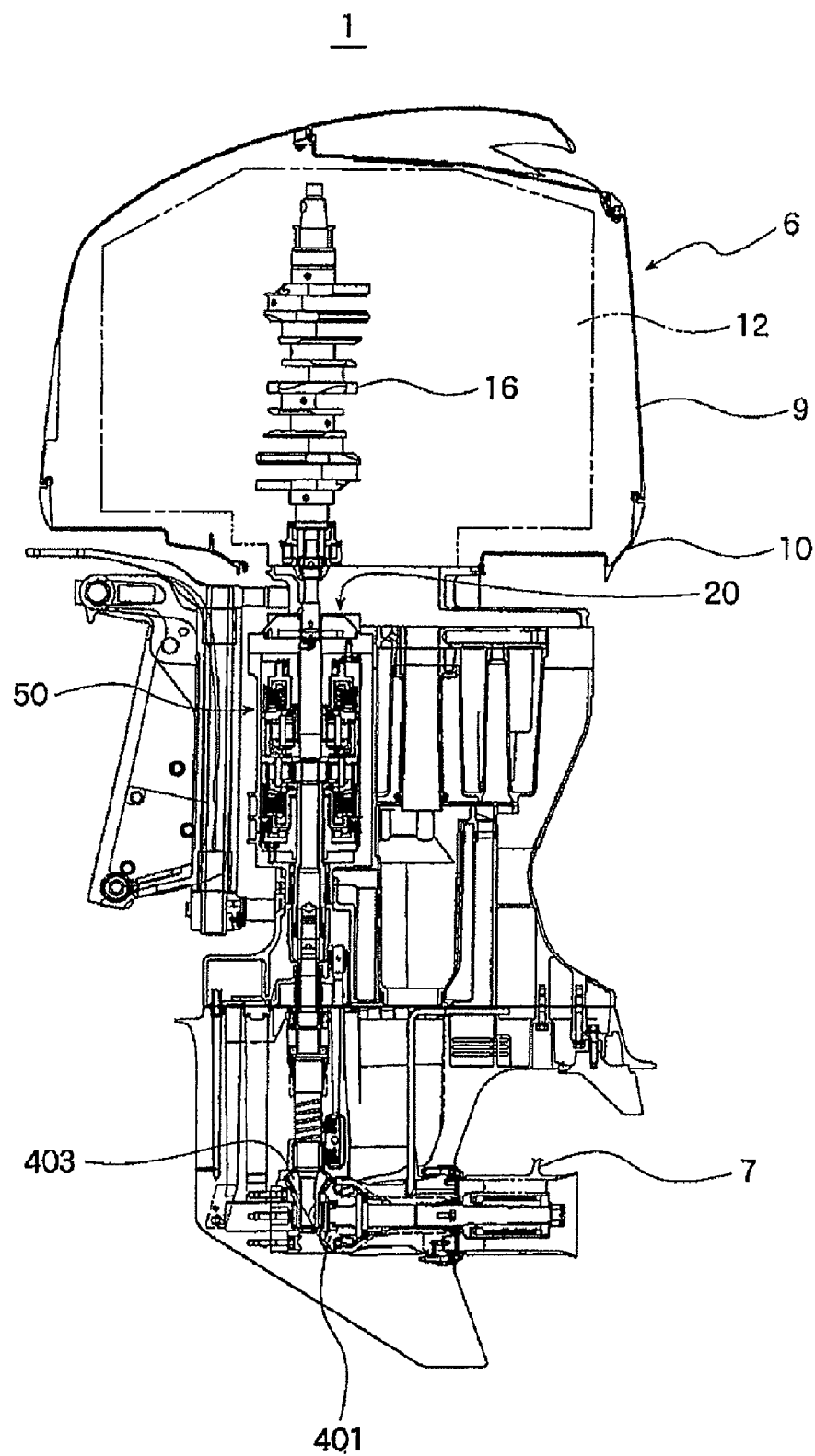

[FIG. 11]
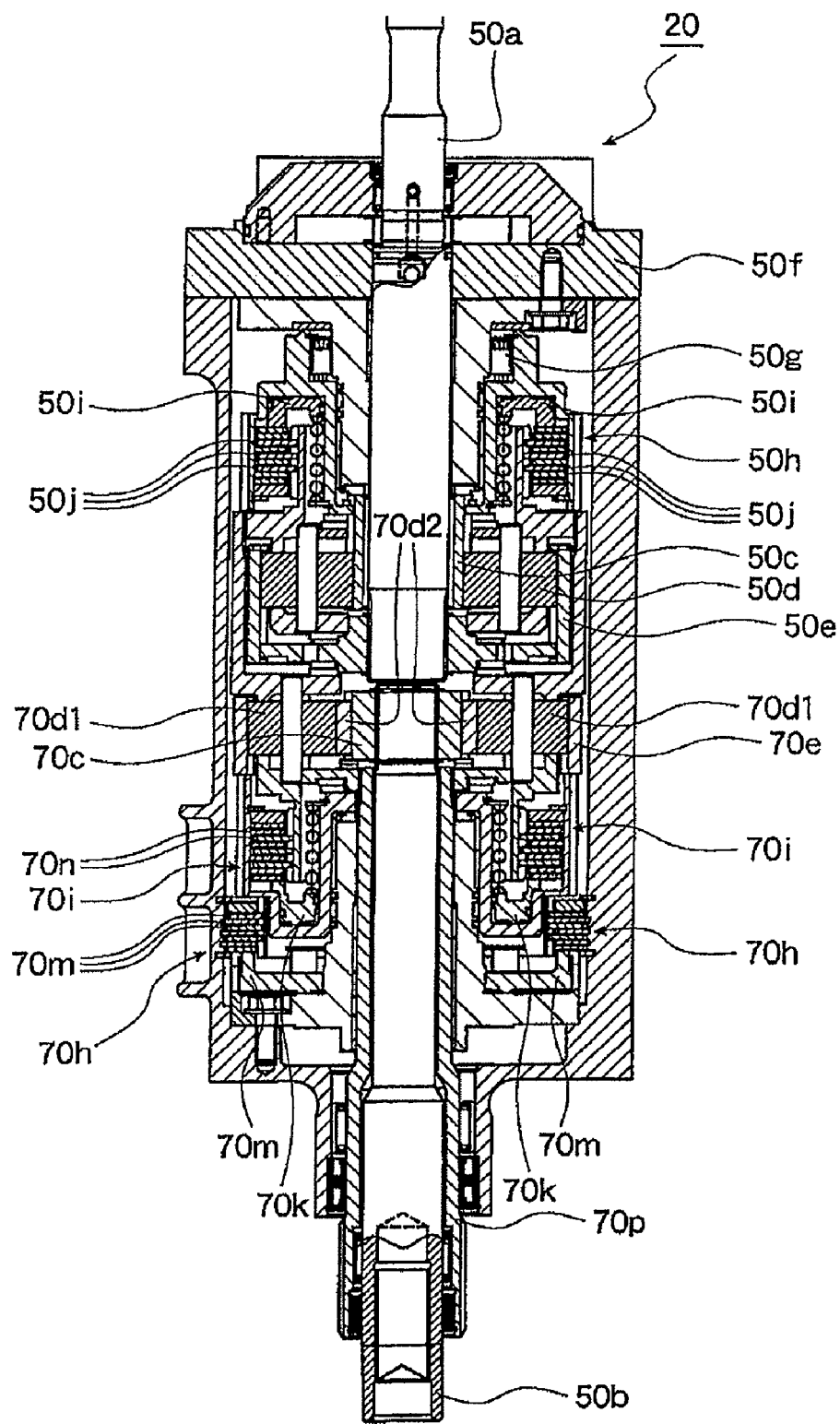

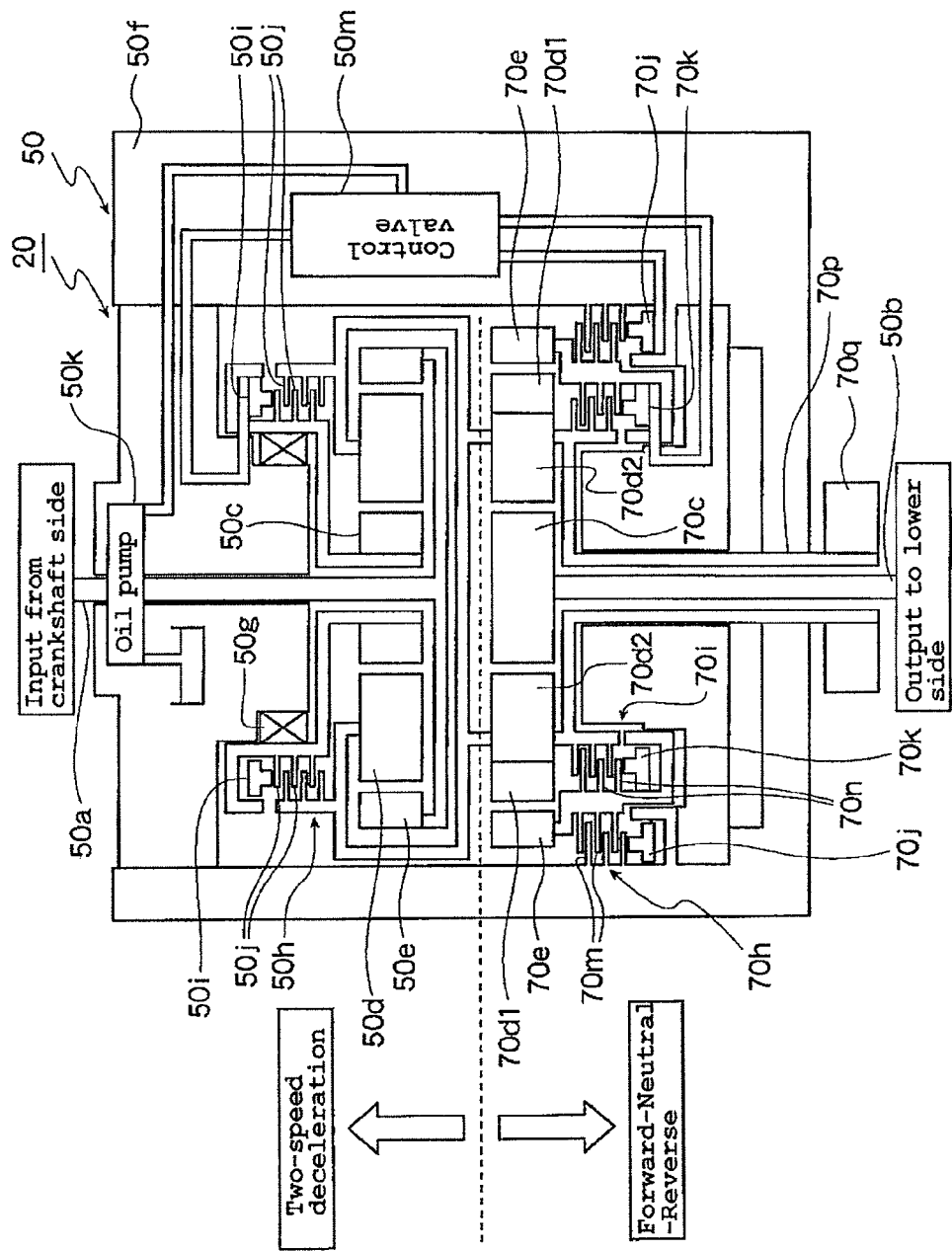
[FIG. 12]

[FIG. 13]
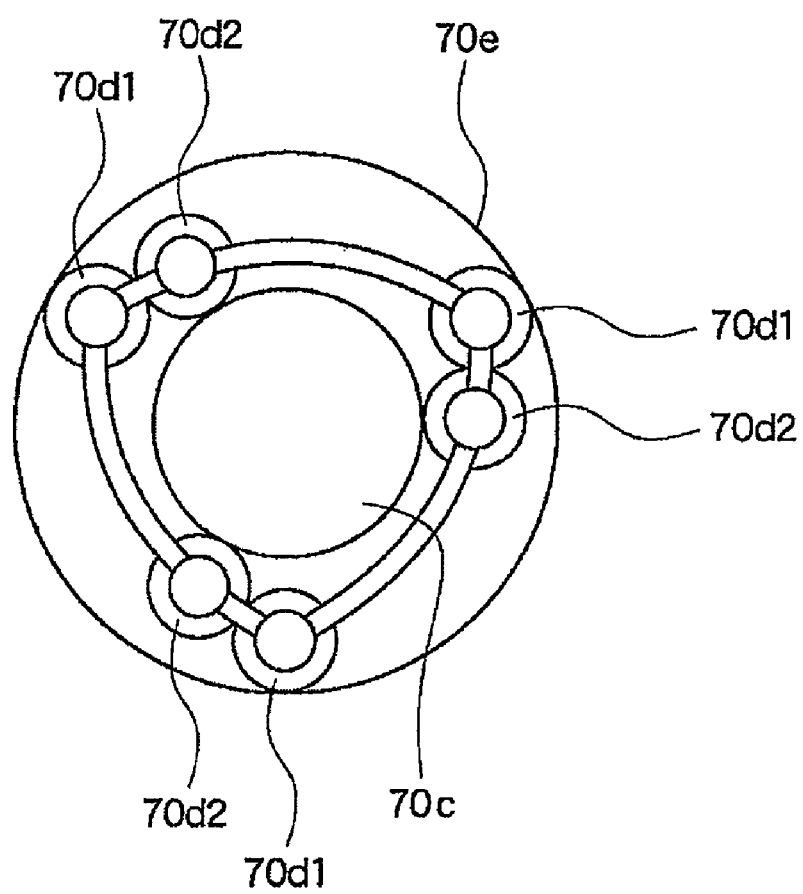

[FIG. 14A]
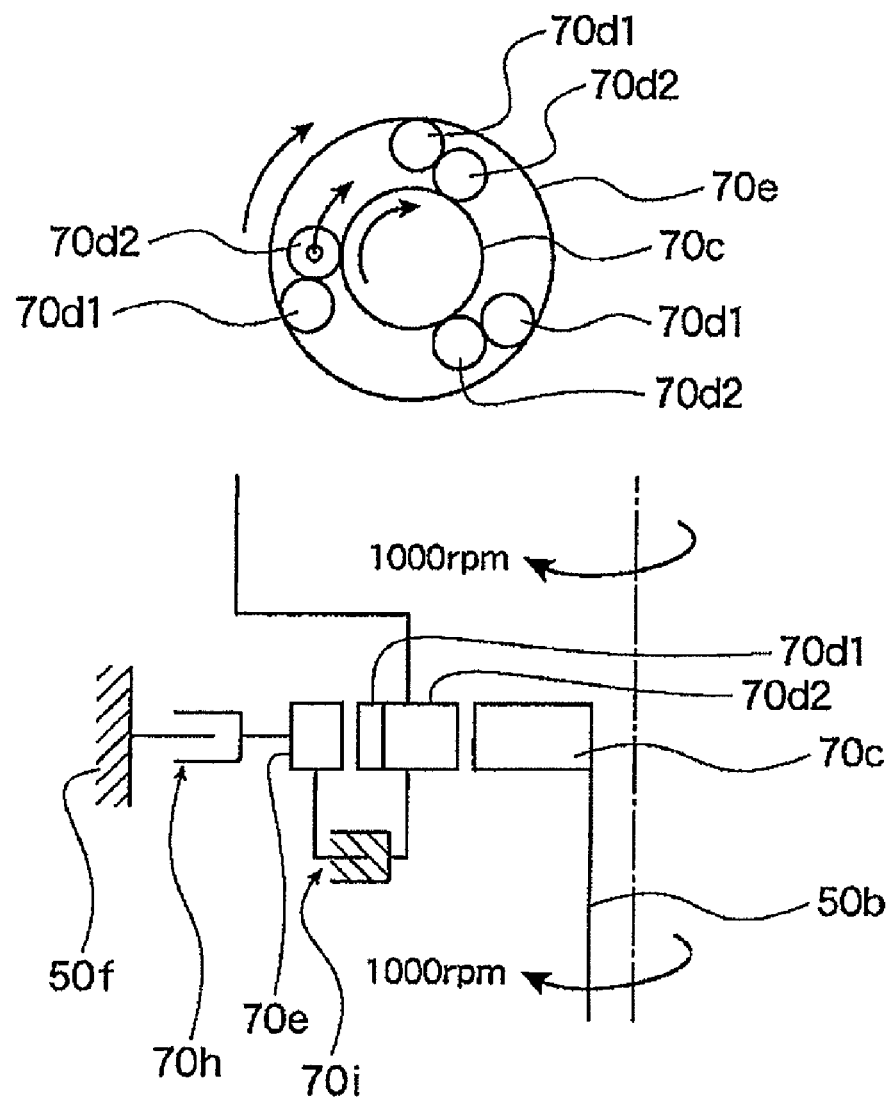

[FIG. 14B]
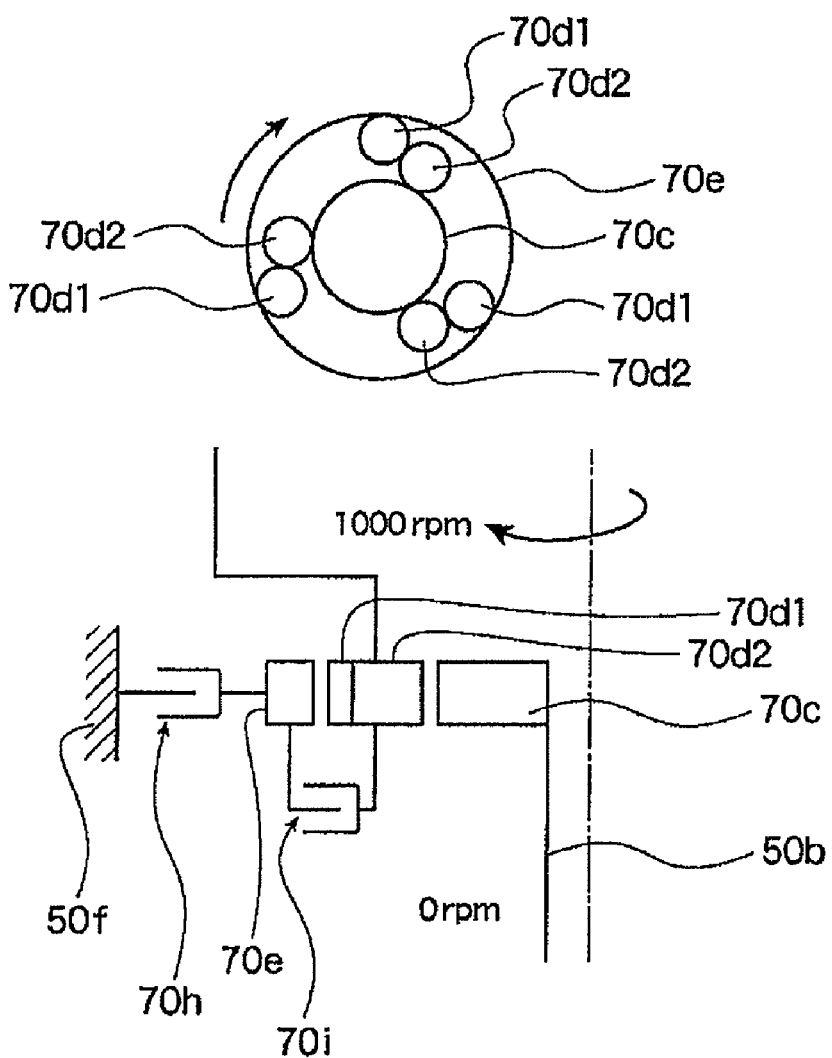

[FIG. 14C]
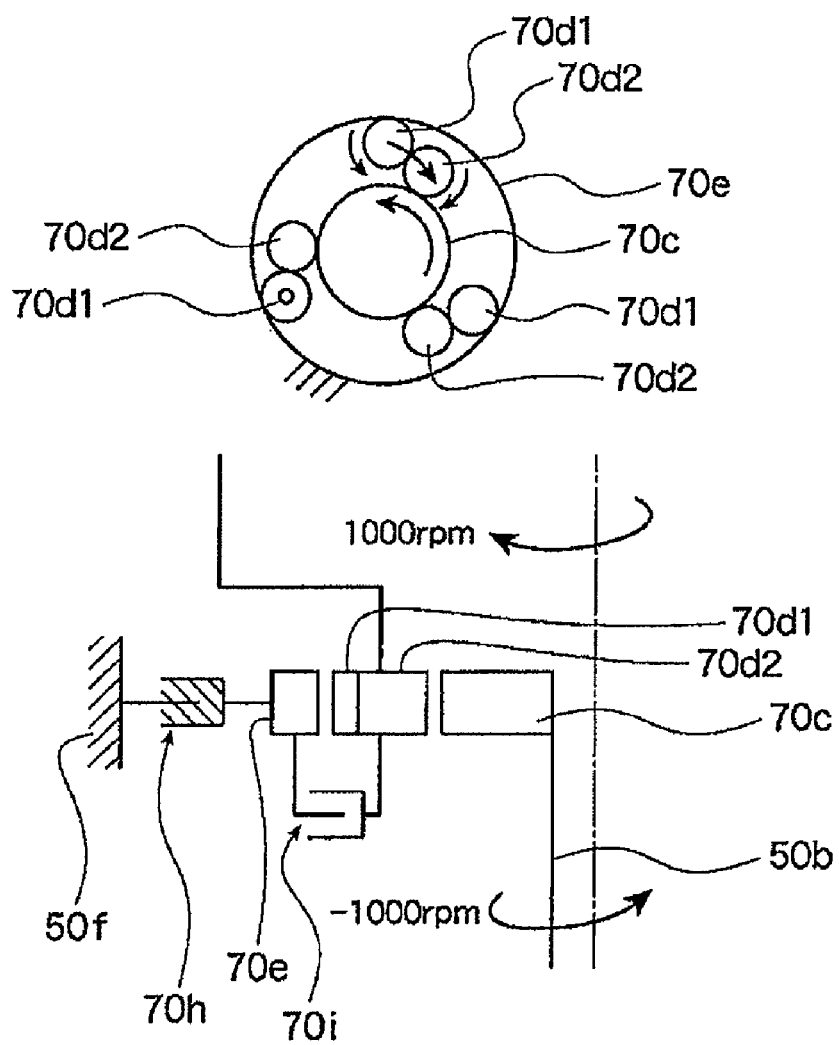

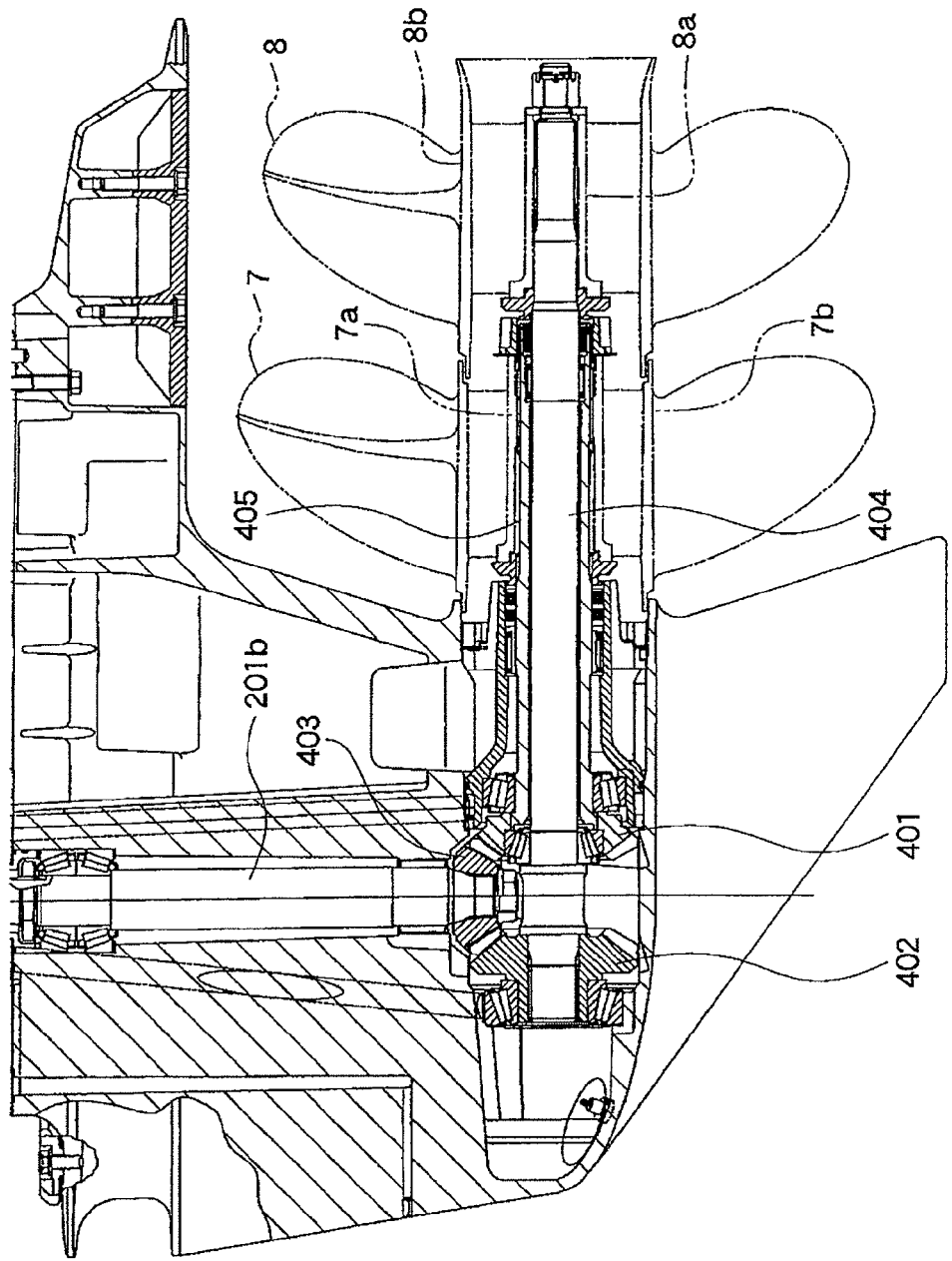
[FIG. 15]

US 8,157,694 B2

OUTBOARD MOTOR

RELATED APPLICATIONS

This application is a U.S. National Phase (35 U.S.C. §371) of International Application No. PCT/JP2006/313675,which was filed on Jul. 10, 2006,and which claims the benefit of Japanese Patent Application No. 2005-205025,which was filed on Jul. 14, 2005. The entirety of each of these applications is hereby incorporated by reference.

BACKGROUND OF THE INVENTION

1. Field of the Invention

The present invention relates to an outboard motor, and more particularly to an outboard motor having a transmission ratio changing unit for changing the output from an engine that is transmitted to a propeller.

2. Description of the Related Art

One example conventional outboard motor of this type is described in Japanese Patent No. 2686517,which discloses an outboard motor having a first drive shaft connected to the output shaft of the engine, a second drive shaft disposed coaxially with the first drive shaft via a transmission ratio changing unit, and a speed reducing and reversing mechanism for transmitting torque transmitted to the second drive shaft to a propeller shaft.

The transmission ratio changing unit comprises first and second planetary gear trains each including a sun gear, a plurality of planetary gears, and an internal gear with which the planetary gears are in meshing engagement.

The axes of rotation of the sun gears of the first and second planetary gear trains are connected by a rotating spindle to integrate them, and a brake mechanism which is operable from outside is disposed adjacent to the rotating spindle. The first drive shaft transmits its torque to the internal gear of the first planetary gear train, and the rotation of an arm for the planetary gears of the first planetary gear train, which is rotated by the torque, is transmitted to the second drive shaft. The arm for the planetary gears of the first planetary gear train and the internal gear of the second planetary gear train are integrated with each other, and a one-way clutch which allows an arm for the planetary gears of the second planetary gear train to rotate in a predetermined direction is provided.

In the above configuration, when the brake mechanism is activated, the speed reduction ratio of the torque to be transmitted to the second drive shaft becomes smaller than before activation of the brake mechanism.

Some outboard motors mounted on boats have a first propeller and a second propeller arranged in tandem in opposed relationship and a contra-rotating propeller mechanism for rotating the first propeller and the second propeller in directions opposite to each other as disclosed in, for example, Japanese Patent Documents JP-A-Hei 7-144695 and JP-A-Hei 9-263294.

Although exhaust gas is discharged into water in both Patent Document '695 and Patent Document '294,exhaust gas is discharged from inside of a propeller cylinder in Patent Document '695 and from outside of a propeller cylinder in Patent Document '294, during acceleration.

Such conventional outboard motors, however, have complicated structures, and a large installation space is required since the transmission ratio changing unit has first and second planetary gear trains with one arranged above the other.

One feature of such a contra-rotating propeller system is that it has very excellent propeller cavitation performance since it has two propellers for producing thrust and thus the total area of the propeller vanes is greater than that of a single propeller system having one propeller for producing thrust. Because of this feature, free spinning of the propellers seldom occurs during acceleration or deceleration of the boat. Therefore, the outboard motor is excellent in starting and acceleration performance and deceleration performance.

Also, one characteristic of a contra-rotating propeller engine is that the required torque, especially on the low-speed side, typically is very large as compared to a single propeller engine having one propeller for producing thrust all the more because free spinning of the propellers seldom occurs. Therefore, a means for increasing the engine output such as a turbo charger or super charger typically is added. However, since there is a limit to the amount by which the torque can be increased and since there is naturally a response time lag between an operation to increase the output and an actual increase in the engine output, the feature of a contra-rotating propeller system cannot be fully exploited. In addition, such a means tends to lower the traveling mileage.

In Japanese Patent Document JP-A-Hei 9-263294,a structure in which exhaust gas discharged from a propeller boss part swirls around the propeller vanes is employed in order to reduce the required torque caused by free spinning of the propellers. This method, however, produces a result in which the high water catching ability of the contra-rotating propeller system is not fully exploited.

In general, slowly rotating a propeller with a relatively large diameter and a high pitch is preferred in terms of the propeller efficiency and results in improvement of the maximum speed and traveling mileage. However, a propeller with a higher pitch requires larger propeller driving torque at the time of acceleration, and great improvement of the traveling performance by increasing the propeller pitch cannot be expected when a low-speed torque improving means such as a turbo charger as mentioned before is employed.

SUMMARY OF THE INVENTION

Accordingly, there is a need in the art for an outboard motor which has a small-sized transmission ratio changing unit and is simple in structure.

There is also a need for an outboard motor which can take the best advantages of the thrust characteristics of a contra-rotating propeller system, in which free spinning of propellers seldom occurs, and can achieve propeller torque characteristics to cope with an increase in propeller pitch.

In accordance with one embodiment, the present invention provides an outboard motor having a power transmission mechanism for transmitting power of an engine to a propeller. The power transmission mechanism has a transmission ratio changing unit comprising a planetary gear train including a sun gear, planetary gears, and an internal gear. The internal gear is connected to an output shaft of the engine, and the planetary gears are connected to a gear train output configured to communicate rotation to the propeller. The sun gear is connected to a stationary portion via a one-way clutch, and the planetary gears are connected to at least one of the internal gear and the sun gear by an on-off clutch. When the on-off clutch is disengaged, the one-way clutch is engaged and the gear train output is driven at a rotational speed that is less than the engine output shaft rotational speed. When the on-off clutch is engaged, the one-way clutch is disengaged and the gear train output is driven at the same rotational speed as the rotational speed of the engine output shaft.

One such embodiment further comprises an oil pump mounted on the engine output shaft and being driven by rotation of the engine output shaft, and a control valve for controlling the supply of oil from the oil pump to each of the clutches.

In another embodiment, each of the clutches is a multiple-disc clutch.

Another embodiment further comprises a power transmission mechanism for transmitting the power of the engine to a first propeller and a second propeller, and a contra-rotating propeller mechanism for rotating the first propeller and the second propeller in directions opposite to each other. The transmission ratio changing unit for changing the transmission ratio between an input side and an output side thereof is provided in the power transmission mechanism. In one such embodiment, the contra-rotating propeller mechanism has two driven gears for driving the first propeller and the second propeller, respectively, and a pinion gear for driving the two driven gears simultaneously, and the output side of the transmission ratio changing unit is coupled to the pinion gear. Another such embodiment further comprises a torque converter device disposed between an output side of the engine and an input side of the transmission ratio changing unit.

In yet another embodiment, the transmission ratio changing unit has a second planetary gear train disposed below the first planetary gear train and including a second sun gear, second double planetary gears, and a second internal gear. The second double planetary gears are connected to the first gear train output, and the second sun gear is connected to a second gear train output that is configured to communicate rotation to the propeller. The second internal gear is connected to a stationary portion via a reverse clutch, and the second double planetary gears are connected by a forward clutch to at least one of the second internal gear and the second sun gear. When the forward clutch is engaged with the reverse clutch disengaged, the second sun gear, the second double planetary gears and the second internal gear rotate together to cause the first planetary gears of the first planetary gear train and the second sun gear of the second planetary gear train to rotate in the same direction at the same speed to establish a forward drive state. When the forward clutch and the reverse clutch are disengaged, each of the second sun gear, the second double planetary gears and the second internal gear rotates freely so that the second gear train output at the second sun gear is substantially zero to establish a neutral state. When the forward clutch is disengaged with the reverse clutch engaged, the second internal gear is brought into a fixed state and the second double planetary gears and the second sun gear rotate to cause the first planetary gears of the first planetary gear train and the second sun gear of the second planetary gear train to rotate in opposite directions so as to establish a reverse state.

One embodiment further comprises a cylindrical water pump driving shaft rotatably disposed around the output side shaft and connected to the shifting double planetary gears, and a water pump is mounted on the water pump driving shaft.

Another embodiment further comprises an oil pump mounted on the engine output shaft and being driven by rotation of the engine output shaft, and a control valve for controlling the supply of oil from the oil pump to each of the clutches.

In a further embodiment, each of the clutches is a multiple-disc clutch. A still further embodiment further comprises a power transmission mechanism for transmitting the power of the engine to a first propeller and a second propeller, and a contra-rotating propeller mechanism for rotating the first propeller and the second propeller in directions opposite to each other. The transmission ratio changing unit for changing the transmission ratio between an input side and an output side thereof is provided in the power transmission mechanism.

In one such embodiment, the contra-rotating propeller mechanism has two driven gears for driving the first propeller and the second propeller, respectively, and a pinion gear for driving the two driven gears simultaneously. The output side of the transmission ratio changing unit is coupled to the pinion gear.

Still another embodiment further comprises a torque converter device disposed between an output side of the engine and an input side of the transmission ratio changing unit.

BRIEF DESCRIPTION OF THE DRAWINGS

FIG. 1 is a side view of an outboard motor equipped on a boat according to an embodiment of the present invention.

FIG. 2 is a cross-sectional view illustrating a power transmission mechanism and a contra-rotating propeller mechanism of the outboard motor of FIG. 1.

FIG. 3 is an enlarged view illustrating the contra-rotating propeller mechanism if FIG. 1.

FIG. 4 is an enlarged view illustrating the power transmission mechanism of FIG. 2.

FIG. 5 is a schematic view of the power transmission mechanism of FIG. 4.

FIG. 6 is a schematic plan view of a transmission ratio changing planetary gear train of the power transmission mechanism of FIG. 4.

FIG. 7A is an explanatory view illustrating the first forward speed state of the power transmission mechanism of FIG. 4.

FIG. 7B is an explanatory view illustrating the second forward speed state of the power transmission mechanism of FIG. 4.

FIG. 8 is a cross-sectional view of an outboard motor according to another embodiment of the present invention.

FIG. 9 is an enlarged cross-sectional view of power transmission mechanism of the outboard motor of FIG. 9.

FIG. 10 is a cross-sectional view of an outboard motor according to yet another embodiment of the present invention.

FIG. 11 is an enlarged cross-sectional view of a power transmission mechanism of the outboard motor of FIG. 10.

FIG. 12 is a schematic view of the power transmission mechanism of FIG. 11.

FIG. 13 is a schematic plan view of a transmission ratio changing planetary gear train of the power transmission mechanism of FIG. 11.

FIG. 14A is an explanatory view illustrating the forward state of the power transmission mechanism of FIG. 11.

FIG. 14B is an explanatory view illustrating the neutral state of the power transmission mechanism of FIG. 11.

FIG. 14C is an explanatory view illustrating the reverse state of the power transmission mechanism of FIG. 11.

FIG. 15 is a cross-sectional view illustrating a lower part of an outboard motor according to still another embodiment of the present invention.

DETAILED DESCRIPTION OF PREFERRED EMBODIMENTS

Description is hereinafter made of embodiments of an outboard motor according to the present invention. It is to be understood, however, that the present invention is not limited to the specific embodiments discussed herein.

FIG. 1 through FIG. 7B illustrate a first embodiment.

In the drawings, FIG. 1 is a side view of an outboard motor equipped on a boat, FIG. 2 is a cross-sectional view illustrating a power transmission mechanism and a contra-rotating propeller mechanism of the outboard motor, FIG. 3 is an enlarged view illustrating the contra-rotating propeller mechanism, and FIG. 4 is an enlarged view illustrating the power transmission mechanism.

As shown in FIG. 1, a boat 1 has a hull 2 with a stern board 2a to which a clamp bracket 4 is secured, and a swivel bracket 5 is attached to the clamp bracket 4 for vertical rotational movement. An outboard motor 6 is attached to the swivel bracket 5 for lateral rotational movement. The outboard motor 6 has a first propeller 7 and a second propeller 8 arranged in tandem.

The illustrated outboard motor 6 has an upper cowling 9, a bottom cowling 10, and a casing 11. An engine 12 is disposed in the upper cowling 9 and the bottom cowling 10. The casing 11 is composed of an upper case 13 and a lower case 14, and an upper part of the upper case 13 is covered with an apron 15.

In the upper case 13 and the lower case 14 forming the casing 11 are disposed a power transmission mechanism 20 for transmitting the power of the engine 12 to the second propeller 8 and the first propeller 7, a forward/reverse switching mechanism 30 for shifting between forward, reverse and neutral, and a contra-rotating propeller mechanism 40 for rotating the first propeller 7 and the second propeller 8 in directions opposite to each other.

The illustrated power transmission mechanism 20 has a drive shaft 201 as shown in FIG. 2, and the drive shaft 201 extends vertically in the upper case 13 and the lower case 14. The drive shaft 201 is provided with a transmission ratio changing unit 50 which is configured to change the transmission ratio between the input side and the output side thereof depending on the engine rotational speed or the engine operating conditions.

In the illustrated embodiment, a torque converter device 51 is disposed on the input side of the transmission ratio changing unit 50. The illustrated torque converter device 51 is connected to an input side drive shaft 201a, which is rotatably supported by an exhaust guide 60 and the engine 12 via bearings 61 and 62, respectively. The input side drive shaft 201a has a driven gear 202 mounted thereon, and the driven gear 202 is in meshing engagement with a driving gear 203 at the lower end of a crankshaft 16 of the engine 12 so that the power of the engine 12 can be transmitted from the crankshaft 16 to the input side drive shaft 201a.

The output side of the transmission ratio changing unit 50 is connected to an output side drive shaft 201b. The output side drive shaft 201b is rotatably supported by the lower case 14 via a bearing 63, and the output of the transmission ratio changing unit 50 can be transmitted to the contra-rotating propeller mechanism 40.

The torque converter device 51 is a power transmission device using oil, which is of the type generally known as an automatic transmission, and has an input side shaft 51a connected to the input side drive shaft 201a and an output side shaft 51b connected to an input side shaft 50a of the transmission ratio changing unit 50 as shown in FIG. 4.

When the engine output is minimized and the shift position is returned to neutral while the boat 1 is moving forward, the boat 1 keeps moving forward at a low speed by inertia, and the first propeller 7 and the second propeller 8 are rotated in the advancing rotation direction by the effect of water flow. If the shift position is changed to reverse at this time, a sudden torque fluctuation occurs on the engine side and the engine tends to stall. Since the torque converter device 51 is interposed between the output side of the engine 12 and the input side of the transmission ratio changing unit 50, however, torque fluctuations can be significantly reduced and quick deceleration can be achieved without causing an engine stall.

Also, the transmission ratio changing unit 50 has, as shown in FIG. 5, a transmission ratio changing planetary gear train including a transmission ratio changing sun gear 50c, transmission ratio changing planetary gears 50d, and a transmission ratio changing internal gear 50e disposed in a housing 50f; an input side shaft 50a connected to the torque converter device 51; and an output side shaft 50b connected to the output side drive shaft 201b.

The transmission ratio changing sun gear 50c is connected to the housing 50f as a "stationary portion" via a one-way clutch 50g and allowed to rotate in one direction but not in the opposite direction. The transmission ratio changing planetary gears 50d and the transmission ratio changing sun gear 50c are configured to integrally engage or disengage via an on-off clutch 50h that is, in the illustrated embodiment, a "multiple-disc clutch".

When a piston 50i is pressed upward by hydraulic pressure, clutch disks 50j of the on-off clutch 50h are brought into pressure engagement with each other to cause the transmission ratio changing planetary gears 50d and the transmission ratio changing sun gear 50c to rotate together.

The piston 50i is configured to receive hydraulic pressure from an oil pump 50k provided on the input side shaft 50a via a control valve 50m. The control valve 50m is controlled by an ECU (engine control unit, not shown) to open and close at predetermined timing.

When the on-off clutch 50h is disengaged, the one-way clutch 50g is engaged and the speed from the input side shaft 50a is outputted from the output side shaft 50b with a reduced speed. When the on-off clutch 50h is engaged, the one-way clutch 50g is disengaged and the speed from the input side shaft 50a is outputted from the output side shaft 50b with the same speed.

The contra-rotating propeller mechanism 40 has two driven gears 401 and 402 for driving the first propeller 7 and the second propeller 8, respectively, and a pinion gear 403 for driving the two driven gears 401 and 402 simultaneously as shown in FIG. 3.

The pinion gear 403 is secured to the lower end of the output side drive shaft 201b for rotation therewith and couples the output side of the transmission ratio changing unit 50 to the pinion gear 403. Bevel gears are used as the driven gears 401 and 402 and the pinion gear 403, and the pinion gear 403, disposed horizontally, is in meshing engagement with the two driven gears 401 and 402 arranged in an opposed relationship.

The two driven gears 401 and 402 are supported on a first propeller shaft 404, which extends to the second propeller 8 on the rear side. The driven gear 401 is supported on a second propeller shaft 405, which extends to the first propeller 7 on the front side.

The second propeller shaft 405 has a rear end, protruding backward from the lower case 14, with which the first propeller 7 is integrally formed for rotation therewith, and the first propeller shaft 404 has a rear end, protruding backward from the second propeller shaft 405 behind the first propeller 7, with which the second propeller 8 is integrally formed for rotation therewith.

The illustrated first propeller 7 and the second propeller 8 respectively have inner cylinders 7a and 8a, outer cylinders 7b and 8b, ribs 7c and 8c connecting the inner cylinders 7a and 8a and the outer cylinders 7b and 8b, respectively, and a plurality of vanes 7d and 8d formed integrally with the outer peripheries of the outer cylinders 7b and 8b. An exhaust passage 406 preferably is formed between the inner cylinders 7a and 8a and the outer cylinders 7b and 8b, and the exhaust passage 406 is communicated with an exhaust passage 407 formed through the lower case 14. The exhaust passage 407 is connected to the exhaust system of the engine 12.

The driven gear 402, rotatably supported by a bearing 408, is disposed around the front end of the first propeller shaft 404 for free rotation, and the driven gear 401, rotatably supported by a bearing 409, is disposed behind the driven gear 402 and around the front end of the second propeller shaft 405 for free rotation.

In the illustrated embodiment, a first slider 410 is in spline engagement with the outer periphery of the front end of the second propeller shaft 405 located inside the paired front and rear drive gears 401 and 402 for back and forth sliding movement along the second propeller shaft 405. Similarly, a second slider 411 is in spline engagement with the outer periphery of the front end of the first propeller shaft 404 located in front of the driven gear 402 for back and forth sliding movement along the first propeller shaft 404.

In addition, a hollow plunger 412 preferably is fitted at the center of the end of the first propeller shaft 404 for back and forth sliding movement, and pins 413 and 414 extending through corresponding slots formed through the first propeller shaft 404 extend perpendicularly through the plunger 412. The first slider 410 is connected to the plunger 412 by the pin 413, and the second slider 411 is connected to the plunger 412 by the pin 414.

Therefore, the first slider 410 and the second slider 411 are connected to each other by the pins 413 and 414, and are slidable back and forth in the range in which the pins 413 and 414 can move in the slots formed through the first propeller shaft 404.

In the illustrated embodiment, a shift cam 426 is attached to the lower end of a shift rod 424 disposed above the second slider 411, and an eccentric pin 426a, which is offset from the central axis (axis of rotation) of the shift rod 424, protrudes from the lower end of the shift cam 426. The eccentric pin 426a is in engagement with the outer periphery of the second slider 411.

When a shift lever (not shown) is operated to rotate the shift rod 424 around its central axis, the eccentric pin 426a of the shift cam 426 rotates to slide the second slider 411 back and forth together with the first slider 410.

In the illustrated embodiment, when the engine 12 is driven, the power of the engine 12 is transmitted from the crankshaft 16 to the input side drive shaft 201a, is changed in speed by the transmission ratio changing unit 50, and drives the output side drive shaft 201b to rotate in one direction. The rotation of the output side drive shaft 201b is transmitted to the paired front and rear driven gears 401 and 402 via the pinion gear 403, and the two driven gears 401 and 402 are constantly driven to rotate in directions opposite to each other.

In accordance with one embodiment, when the transmission ratio changing unit 50 is in its first forward speed mode, the control valve 50m is closed so that no hydraulic pressure may be applied to the piston 50i to allow the transmission ratio changing planetary gears 50d to rotate freely with respect to the transmission ratio changing sun gear 50c as shown in FIG. 7A.

When the transmission ratio changing internal gear 50e is rotated in a predetermined direction (direction of the arrow "a" in the drawing) in this state, the transmission ratio changing planetary gears 50d orbit inside the transmission ratio changing internal gear 50e in the direction of the arrow "b". That is, when the transmission ratio changing internal gear 50e rotates in the direction of the arrow "a", the transmission ratio changing planetary gears 50d rotate on their axes in the direction of the arrow "c", and the transmission ratio changing sun gear 50c in meshing engagement with the transmission ratio changing planetary gears 50d is urged to rotate in the direction of the broken-line arrow "e". However, since the transmission ratio changing sun gear 50c is restrained from rotating in the direction by the one-way clutch 50g, the transmission ratio changing planetary gears 50d orbit in the direction of the arrow "b", that is, in the same direction as the transmission ratio changing internal gear 50e, at a rotational speed slower than that of the transmission ratio changing internal gear 50e. Therefore, the output side shaft 50b rotates in the same direction as the input side shaft 50a at a speed slower than that of the input side shaft 50a.

When the transmission ratio changing unit 50 is in its second forward speed mode, the control valve 50m is held open so that hydraulic pressure can be applied to the piston 50i to keep the clutch disks 50j in pressure contact with each other as shown in FIG. 7B. Therefore, the transmission ratio changing planetary gears 50d and the transmission ratio changing sun gear 50c are fixed to each other.

When the transmission ratio changing internal gear 50e is rotated in a predetermined direction (direction of the arrow "f" in the drawing) in this state, since the transmission ratio changing internal gear 50e and the transmission ratio changing planetary gears 50d are connected to each other and since the one-way clutch 50g is allowed to rotate in the direction of the arrow "f" in the drawing, the transmission ratio changing internal gear 50e, the transmission ratio changing planetary gears 50d and the transmission ratio changing sun gear 50c rotate together in the direction of the arrow "f". Therefore, the input side shaft 50a and the output side shaft 50b rotate in the same direction at the same speed.

In the illustrated embodiment, when the shift lever (not shown) is set to "neutral position", the first slider 410 and the second slider 411 are held in a neutral state in which they are both in meshing engagement with neither of the two driven gears 401 and 402 as shown in FIG. 3. At this time, both the driven gears 401 and 402 rotate freely (idle) and rotation of the output side drive shaft 201b is not transmitted to the first propeller shaft 404 and the second propeller shaft 405. Therefore, in the neutral state, neither the first propeller 7 nor the second propeller 8 arranged in tandem rotates and no propulsive force is generated.

When the shift lever is set to "forward position", the shift rod 424 and the shift cam 426 are rotated through a predetermined angle. Then, the first slider 410 and the second slider 411 are slid backward together, and brought into meshing engagement with the driven gear 401 on the rear side and the driven gear 402 on the front side, respectively.

Therefore, the rotation of the output side drive shaft 201b is transmitted to the second propeller shaft 405 via the pinion gear 403, the driven gear 401 and the first slider 410 and to the first propeller shaft 404 via the pinion gear 403, the driven gear 402 and the second slider 411, and the second propeller shaft 405 and the first propeller 7 secured thereto and the first propeller shaft 404 and the second propeller 8 secured thereto are driven to rotate in directions opposite to each other. During forward travel, contra-rotation operation in which the first propeller 7 and the second propeller 8 arranged in tandem are driven to rotate in directions opposite to each other is achieved as described above, and high propulsive efficiency can be achieved by the first propeller 7 and the second propeller 8.

When the shift lever (not shown) is set to "reverse position", the shift rod 424 and the shift cam 426 are rotated in a predetermined direction through a predetermined angle and the first slider 410 and the second slider 411 are slid forward together. Then, the meshing engagement between the second slider 411 and the driven gear 402 is released and the meshing engagement of the first slider 410 is switched from the driven gear 401 on the rear side to the driven gear 402 on the front side. That is, first slider 410 is released from the driven gear 401 on the rear side and brought into meshing engagement with the driven gear 401 on the front side.

Then, the rotation of the output side drive shaft 201b is transmitted only to the second propeller shaft 405 via the pinion gear 403, the driven gear 402 on the front side and the first slider 410 and not to the first propeller shaft 404. Therefore, only the second propeller shaft 405 and the first propeller 7 secured thereto are driven to rotate in a direction opposite to the direction for forward travel.

Since only the first propeller 7 is driven to rotate during reverse travel as described above, the second propeller 8 in a stationary state does not interfere with the rotation of the first propeller 7. Therefore, the first propeller 7 provides high propulsive efficiency and sufficient propulsive force can be achieved.

It is to be understood that this embodiment, in which contra-rotating propellers are driven through a transmission as just disclosed, is given as an example. As such, other embodiments may use different propeller and transmission configurations.

A large amount of flue gas exhausted from the high-power engine 12 is discharged into water through the exhaust passage 407 and the exhaust passage 406. Since bubbles of the flue gas are crushed by the first propeller 7 and the second propeller 8 rotating in directions opposite to each other, the influence of the flue gas on the first propeller 7 and the second propeller 8 is very little.

In the outboard motor embodiments as described above, since a transmission ratio changing planetary gear train is combined with the one-way clutch 50g and the on-off clutch 50h, two speed modes, that is, the first and second speed modes, can be achieved with only one transmission ratio changing planetary gear train. Therefore, the size of the transmission ratio changing unit 50 can be decreased.

Also, since the transmission ratio changing unit 50 has a transmission ratio changing planetary gear train including the transmission ratio changing sun gear 50c, the transmission ratio changing planetary gears 50d, and the transmission ratio changing internal gear 50e, the transmission ratio can be changed without shutting off power or changing the engagement of gears during the changing operation. Therefore, since the power for driving the propellers is not interrupted, a transmission ratio changing operation can be carried out easily even during acceleration and optimum transmission ratio change timing can be realized in boats, which receive a much larger resistance than land transportation vehicles during traveling.

In addition, since the illustrated transmission ratio changing unit 50 is provided, satisfactory driving torque characteristics can be achieved by selecting a high transmission ratio especially during traveling at a low speed and the starting and acceleration performance and deceleration performance can be improved dramatically by utilizing its maximum propeller performance.

Moreover, when the propeller pitch is increased for higher propeller efficiency, since large driving torque can be obtained on the low-speed side, lowering of the acceleration performance can be prevented and, at the same time, the traveling mileage and the maximum speed can be improved by the effect of the high-pitch propellers.

Also, since the output side of the transmission ratio changing unit 50 is coupled to the pinion gear 403, there is no need to change the transmission ratio between the pinion gear 403 and the two driven gears 401 and 402. Therefore, the degree of freedom in gear design increases and compact design can be achieved.

When a boat's engine output is minimized and the shift position is returned to neutral while a boat is moving forward, the boat keeps moving forward at a low speed by inertia and the propellers are rotated in the advancing rotation direction by the effect of water flow. If the shift position is changed to reverse at this time, a sudden torque fluctuation occurs on the engine side and the engine tends to stall. However, since the torque converter device 51 is interposed between the output side of the engine 12, and the input side of the transmission ratio changing unit 50 in the illustrated embodiment, torque fluctuations can be significantly reduced and quick deceleration can be achieved without causing an engine stall.

Although the transmission ratio changing unit 50 is located on the drive shaft 201 in the power transmission mechanism 20 in the illustrated embodiment, its position is not specifically limited. For example, the transmission ratio changing unit 50 may be mounted on an extension of the crankshaft 16. Also, the transmission ratio changing unit 50 is not limited to the simple planetary type as shown in FIG. 4, and various types of planetary gear mechanism such as a dual planetary type can be employed. In addition, the torque converter device 51 is not limited to a power transmission device using oil.

FIG. 8 and FIG. 9 show another embodiment, which is different from the embodiments just discussed in that the torque converter 51 is not provided, that the input side shaft 50a and the output side shaft 50b are disposed coaxially with the crankshaft 16, that not two but only one propeller 7 is provided, and that a dog clutch 415 is provided instead of the first and second sliders 410 and 411.

In this embodiment, when the shift lever (not shown) is operated to rotate the shift rod 424 about its central axis, the eccentric pin 426a of the shift cam 426 is rotated and the dog clutch 415 is slid on the propeller shaft 416. In a neutral position in which the dog clutch 415 is in meshing engagement with neither of the driven gears 401 and 402, the propeller 7 does not rotate. In a forward position in which the dog clutch 415 is in meshing engagement with the driven gear 401, the propeller 7 rotates in the advancing direction. In a reverse position in which the dog clutch 415 is in meshing engagement with the driven gear 402, the propeller 7 rotates in the reversing direction.

Since the outboard motor embodiment described above is equipped with a transmission ratio changing unit 50 as in the above-discussed embodiments, the same effect as described before can be achieved.

FIG. 10 through FIG. 14C show yet another embodiment that is different from the embodiment of FIGS. 8 and 9 in that a shift switching planetary gear train for shift switching is newly provided below a two-speed transmission ratio changing gear train and that the shift rod 424, the shift cam 426, the eccentric pin 426a, the dog clutch 415 and one of the driven gears, 402 are omitted because the shift switching planetary gear train is provided.

The illustrated shift switching planetary gear train has a shift switching sun gear 70c, first and second shift switching planetary gears 70d1 and 70d2, and a shift switching internal gear 70e as shown in FIG. 11, FIG. 12 and so on. The first and second shift switching planetary gears 70d1 and 70d2 preferably are in meshing engagement with each other as shown in FIG. 13. The first transmission ratio changing planetary gears 70d1 are in meshing engagement with the transmission ratio changing sun gear 70c and the second transmission ratio changing planetary gears 70d2 are in meshing engagement with the transmission ratio changing internal gear 70e.

In the illustrated shift switching planetary gear train, the first shift switching planetary gears 70d1 are connected to transmission ratio changing planetary gears 50d of the two-speed transmission ratio changing planetary gear train, and the shift switching sun gear 70c is connected to the output side shaft 50b as shown in FIG. 11, FIG. 12 and FIG. 14.

Also, the illustrated shift switching internal gear 70e of the shift switching planetary gear train is connected to the housing 50f via a first on-off clutch 70h, and the shift switching internal gear 70e and the first and second shift switching planetary gears 70d1 and 70d2 are connected via a second on-off clutch 70i.

The illustrated first on-off clutch 70h and the second on-off clutch 70i have first and second pistons 70j and 70k, respectively, and hydraulic pressure can be applied to the first and second pistons 70j and 70k from an oil pump 50k via a control valve 50m. The control valve 50m is connected to an ECU (not shown) and controlled thereby.

In the illustrated embodiment, when hydraulic pressure is applied to the first piston 70j and clutch disks 70m of the first on-off clutch 70h are brought into pressure contact with each other, the shift switching internal gear 70e is fixed to the housing 50f. When hydraulic pressure is applied to the second piston 70k and clutch disks 70n of the second on-off clutch 70i are brought into pressure contact with each other, the shift switching internal gear 70e and the first and second shift switching planetary gears 70d1 and 70d2 are fixed to each other. When no hydraulic pressure is applied, the clutch disks 70m and 70n of the on-off clutches 70h and 70i are not brought into pressure contact with each other and the shift switching internal gear 70e and so on are allowed to rotate freely.

In addition, the shift switching sun gear 70c preferably has an output side shaft 50b extending downward therefrom, and the output side shaft 50b is encased in a cylindrical water pump driving shaft 70p. The water pump driving shaft 70p is connected to the first and second shift switching planetary gears 70d1 and 70d2.

A water pump 70q connected to the lower end of the water pump driving shaft 70p preferably supplies cooling water to the engine 12.

In the illustrated embodiment, the function of the two-speed transmission ratio changing planetary gear train on the upper side is the same as that in embodiments discussed above in connection with FIGS. 1-8, and hence its description is omitted.

In the forward mode, the control valve 50m preferably is so controlled by the ECU as to disengage the first on-off clutch 70h and to engage the second on-off clutch 70i as shown in FIG. 14A. Then, the shift switching internal gear 70e, the first and second shift switching planetary gears 70d1 and 70d2 and the shift switching sun gear 70c of the shift switching planetary gear train rotate together in the direction of the arrows in FIG. 14A at the same rotational speed as the two-speed transmission ratio changing planetary gear train side to propel the boat 1 forward.

In neutral mode, the control valve 50m is so controlled by the ECU as to disengage the first and second on-off clutches 70h and 70i as shown in FIG. 14B. Then, each of the shift switching internal gear 70e, the first and second shift switching planetary gears 70d1 and 70d2 and the shift switching sun gear 70c rotates freely. Therefore, even when torque is inputted from the two-speed transmission ration changing planetary gear train side to the first and second shift switching planetary gears 70d1 and 70d2 side, the power is not transmitted to the output side shaft 50b and a neutral state is established.

In reverse mode, the control valve 50m is so controlled by the ECU as to engage the first on-off clutch 70h and to disengage the second on-off clutch 70h. Then, the shift switching internal gear 70e is fixed to the housing 50f. Thus, when torque is inputted from the two-speed transmission ration changing planetary gear train side to the first and second shift switching planetary gears 70d1 and 70d2 side, the first and second shift switching planetary gears 70d1 and 70d2 rotate in directions opposite to each other as indicated by the arrows in FIG. 14C while moving inside the shift switching internal gear 70e. Then, the shift switching sun gear 70c rotates in a direction (as indicated by the arrow in the drawing) opposite to the rotation direction of the first and second shift switching planetary gears 70d1 and 70d2 (indicated by the arrow in the drawing) to propel the boat 1 backward.

In the illustrated embodiment, the water pump driving shaft 70p, which is not rotated in the neutral state, is attached to the first and second shift switching planetary gears 70d1 and 70d2 and is always rotated in the same direction. Therefore, the water pump 70q attached to the water pump driving shaft 70p always rotates in the same direction and preferably can constantly fulfill its function as a pump. The water pump 70q is of a type which can fulfill the function as a pump while rotating in one direction but not while rotating in the opposite direction.

In the outboard motor as described above, since the two-speed transmission ratio changing planetary gear train is disposed on the upper side and the shift switching planetary gear train on the lower side as shown in FIG. 11 and FIG. 12, the gear trains can be arranged in a more compact manner. Also, since the dog clutch 415, a mechanism for driving the dog clutch 415, the driven gear 402 and so on are not required, the structure can be significantly simplified.

FIG. 15 shows still another embodiment. This drawing shows the structure of a lower part of an outboard motor 6. The structure of the part above the drawing area preferably is substantially the same as that of the embodiment just discussed, and the outboard motor 6 has a two-speed transmission ration changing planetary gear train and a shift switching planetary gear train.

However, the illustrated embodiment has a pair of propellers 7 and 8 rotatable in directions opposite to each other.

In the illustrated embodiment, a driven gear 402 on the front side is connected to a first propeller shaft 404 for rotation therewith. The first propeller shaft 404 extends to the second propeller 8, and the second propeller 8, is connected to the first propeller shaft 404. A driven gear 401 on the read side is connected to a second propeller shaft 405 for rotation therewith. The second propeller shaft 405 extends to the first propeller 7, and the first propeller 7 is connected to the second propeller shaft 405.

A pinion gear 403 attached to the lower end of an output side drive shaft 201b is in meshing engagement with both the driven gears 401 and 402. When the pinion gear 403 is rotated in a predetermined direction, the driven gears 401 and 402 are rotated in directions opposite to each other to rotate the first and second propellers 7 and 8 in directions opposite to each other.

In the outboard motor with the structure as described above, the propellers 7 and 8 can be rotated in directions opposite to each other at two different speeds by controlling the two-speed transmission ratio changing planetary gear train, and each of the first and second propellers 7 and 8 can be shifted to a forward state, a neutral state, or a reverse state by controlling the shift switching planetary gear train.

In an outboard motor as described above, since the pinion gear 403 is in constant meshing engagement with both the driven gears 401 and 402, the transmission ratio can be changed without shutting off power or changing the engagement of gears during the changing operation. Therefore, since the power for driving the propellers is not interrupted, a transmission ratio changing operation can be carried out easily even during acceleration and optimum transmission ratio change timing can be realized in boats, which receive a much larger resistance than land transportation vehicles during traveling.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An outboard motor comprising:
   a power transmission mechanism arranged to transmit power of an engine to a propeller, the power transmission mechanism including:
      a transmission ratio changing unit including a first planetary gear train including a first sun gear, first planetary gears, and a first internal gear, the first internal gear being connected to a first output shaft of the engine, the first planetary gears being connected to a gear train output, the first sun gear being connected to a stationary portion via a one-way clutch, and the first planetary gears being connected to at least one of the first internal gear and the first sun gear by an on-off clutch; wherein
   when the on-off clutch is disengaged, the one-way clutch is engaged and the gear train output is driven at a rotational speed that is less than a rotational speed of the first output shaft of the engine;
   when the on-off clutch is engaged, the one-way clutch is disengaged and the gear train output is driven at the same rotational speed as the rotational speed of the first output shaft of the engine;
   the transmission ratio changing unit includes a second planetary gear train disposed below the first planetary gear train and including a second sun gear, second double planetary gears, and a second internal gear, the second double planetary gears are connected to the gear train output, and the second sun gear is connected to a second output shaft that is arranged to communicate rotation to the propeller, the second internal gear is connected to a stationary portion via a reverse clutch, and the second double planetary gears are connected by a forward clutch to at least one of the second internal gear and the second sun gear;
   when the forward clutch is engaged with the reverse clutch disengaged, the second sun gear, the second double planetary gears, and the second internal gear rotate together to cause the first planetary gears of the first planetary gear train and the second sun gear of the second planetary gear train to rotate in the same direction at the same speed to establish a forward drive state;
   when the forward clutch and the reverse clutch are disengaged, each of the second sun gear, the second double planetary gears, and the second internal gear rotates freely so that a rotational speed of the second output shaft at the second sun gear is substantially zero to establish a neutral state; and
   when the forward clutch is disengaged with the reverse clutch engaged, the second internal gear is brought into a fixed state and the second double planetary gears and the second sun gear rotate to cause the first planetary gears of the first planetary gear train and the second sun gear of the second planetary gear train to rotate in opposite directions so as to establish a reverse state.

2. The outboard motor as set forth in claim 1, further comprising a cylindrical water pump driving shaft rotatably disposed around the second output shaft and connected to the second double planetary gears, and a water pump is mounted on the cylindrical water pump driving shaft.

3. The outboard motor as set forth in claim 1, further comprising an oil pump mounted on the first output shaft of the engine and arranged to be driven by rotation of the first output shaft of the engine, and a control valve arranged to control the supply of oil from the oil pump to each of the clutches.

4. The outboard motor as set forth in claim 1, wherein each of the clutches is a multiple-disc clutch.

5. The outboard motor as set forth in claim 1, wherein the propeller includes a first propeller and a second propeller and a contra-rotating propeller mechanism arranged to rotate the first propeller and the second propeller in directions opposite to each other; wherein
   the power transmission mechanism is arranged to transmit the power of the engine to the first propeller and the second propeller.

6. The outboard motor as set forth in claim 5, wherein the contra-rotating propeller mechanism includes two driven gears arranged to drive the first propeller and the second propeller, respectively, and a pinion gear arranged to drive the two driven gears simultaneously, and wherein the second output shaft of the transmission ratio changing unit is coupled to the pinion gear.

7. The outboard motor as set forth in claim 1, further comprising a torque converter device disposed between an output side of the engine and an input side of the transmission ratio changing unit.

8. An outboard motor comprising:
   a power transmission mechanism arranged to transmit a power of an engine to a propeller, the power transmission mechanism including:
      a transmission ratio changing unit including a transmission ratio planetary gear train arranged to change a transmission ratio, the transmission ratio planetary gear train being connected to a first output shaft of the engine such that the transmission ratio planetary gear train reduces a rotational speed of the first output shaft and outputs the power of the engine via an output; and a shift switching planetary gear train arranged to switch a rotational direction of the output of the transmission ratio planetary gear train between forward, neutral, and reverse, the shift switching planetary gear train including a sun gear, double planetary gears, and an internal gear and being arranged below the transmission ratio planetary gear train and connected to the output of the transmission ratio planetary gear train; wherein a second output shaft of the shift switching planetary gear train and a propeller shaft are in constant meshing engagement with each other.

9. The outboard motor as set forth in claim 8, further comprising an oil pump mounted on the first output shaft of the engine and arranged to be driven by rotation of the first output shaft of the engine, and a control valve arranged to control the supply of oil from the oil pump to clutches in the transmission ratio planetary gear train and the shift switching planetary gear train.

10. The outboard motor as set forth in claim 8, wherein the propeller includes a first propeller and a second propeller and a contra-rotating propeller mechanism arranged to rotate the first propeller and the second propeller in directions opposite to each other; wherein the power transmission mechanism is arranged to transmit the power of the engine to the first propeller and the second propeller.

11. The outboard motor as set forth in claim 10, wherein the contra-rotating propeller mechanism includes two driven gears arranged to drive the first propeller and the second propeller, respectively, and a pinion gear arranged to drive the two driven gears simultaneously, and wherein the second output shaft of the shift switching planetary gear train is coupled to the pinion gear.

12. The outboard motor as set forth in claim 8, further comprising a torque converter device disposed between an output side of the engine and an input side of the transmission ratio changing unit.

* * * * *